April 26, 1932.  M. BERG  1,855,217
BOOM ATTACHMENT FOR TRACTORS
Filed April 17, 1930    2 Sheets-Sheet 1

INVENTOR
Magnus Berg
BY Loyal J. Miller
ATTORNEY

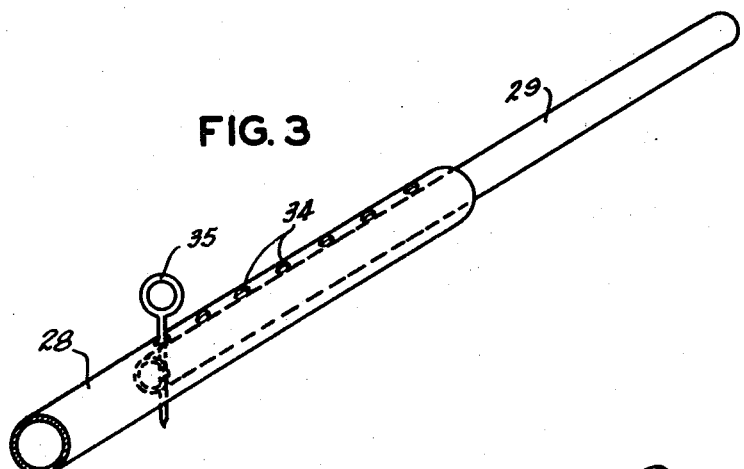
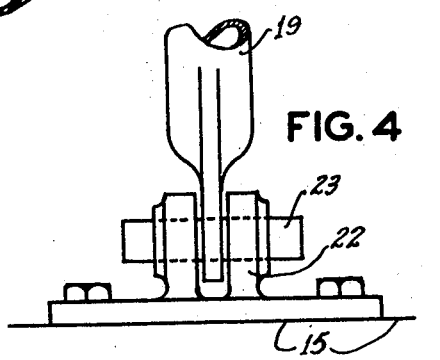
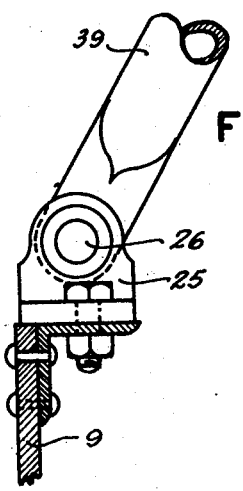
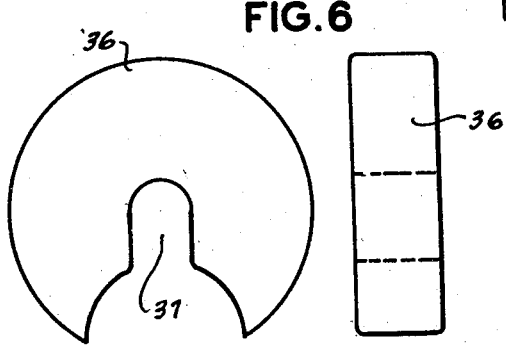

Patented Apr. 26, 1932

1,855,217

UNITED STATES PATENT OFFICE

MAGNUS BERG, OF CUSHING, OKLAHOMA

BOOM ATTACHMENT FOR TRACTORS

Application filed April 17, 1930. Serial No. 444,899.

My invention relates to hoisting booms, and more particularly to booms for attachment to tractors and other vehicles, particularly those used in pipe line work.

The objects of my invention are to provide a device of this class which is new, novel, practical and of utility; which may be easily and quickly attached; the weight of which will be supported directly upon the frame of the vehicle; which will require no more width in road clearance than the vehicle upon which it is attached; which will function regardless of the depth to which the vehicle treads may become sunk in soft earth; which will be strong and durable; which may be attached upon the front, rear, or either side of the vehicle; which will lift more weight than the usual tractor boom attachment under similar conditions; and which will be efficient in accomplishing all the purposes for which it is intended.

There are at the present time a number of boom attachments for vehicles in use, but so far as applicant knows or can ascertain there are objectionable features embodied in each and all of them. All, within applicant's knowledge are attached outstanding from the vehicle, and sufficiently near the ground to cause considerable trouble when the vehicle is working in soft earth. Many times it becomes necessary to remove the boom entirely from the vehicle in order that it may proceed.

Another serious trouble encountered with the vehicle boom attachments of present use, is their damage to the vehicle power plant. All of them at present so far as this applicant has been able to ascertain are braced or supported upon the vehicle power plant instead of upon the vehicle's chassis. In using this mode of supporting or bracing the boom, there have been many instances in which the power plant has been broken, and times when it has been twisted entirely out of the vehicle frame.

Applicant's device does not in any manner hamper the progress of the vehicle. It is supported upon the chassis of the vehicle and thus is noninjurious to the power plant. It overcomes many of the impractical features of devices of this class now in use, as well as accomplishing many new and novel results of its own.

With these and other objects in view as will more fully appear, my invention consists in the construction, novel features, and combination of parts hereinafter more fully described, pointed out in the claims hereto appended, and illustrated in the accompanying two sheets of drawings, of which, Figure 1 is a front elevational view of a usual tractor, showing the device installed thereon;

Fig. 3 is a detail of the telescoping member for regulating the boom;

Fig. 4 is an elevational detail view of the pivotal connection which is typical throughout the device;

Fig. 5 is a side elevational view of a slightly different embodiment of the organization shown in Fig. 4; and, Fig. 6 shows front and side views of one of the counter balance weights.

Like characters of reference designate like parts in all the figures.

Figure 1:
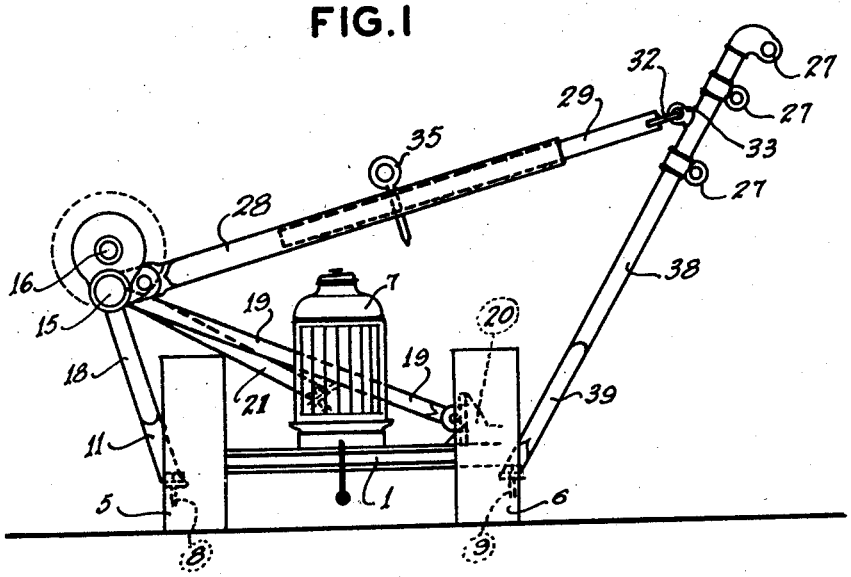
Figure 2:
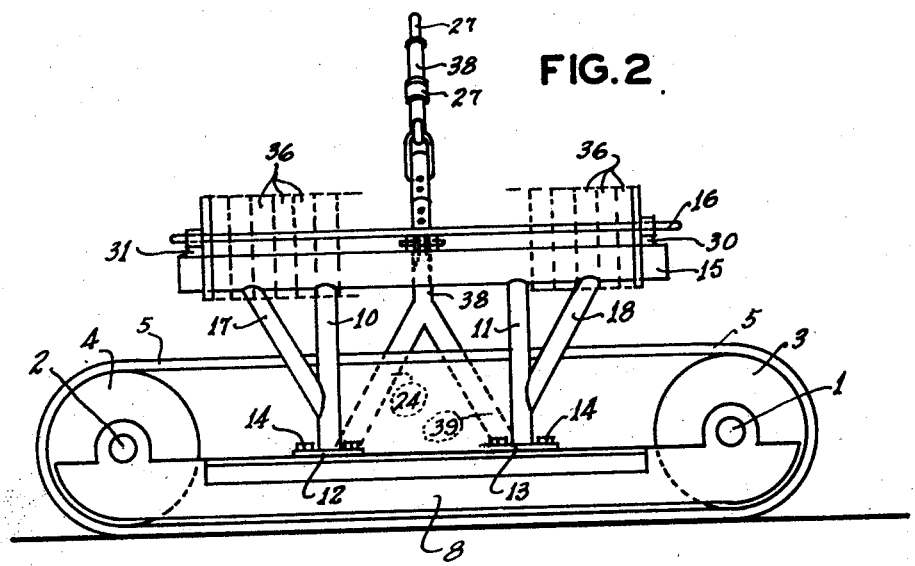
Fig. 2 is a side elevational view of the same.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

The device as heretofore described is adapted for attachment upon any vehicle, but is illustrated and will be described herein as being disposed upon a caterpillar tractor having a front axle 1, and a rear axle 2, each supported by a pair of front wheels 3 and rear wheels 4. A pair of caterpillar treads 5 and 6 are mounted upon said wheels and are adapted to be driven by said wheels which are in turn driven by a power plant, not shown, but the radiator of which is shown at 7. Upon the outer ends of each of said axles 1 and 2, is one of a pair of frame members or beams 8 and 9 which are usually formed by a heavy I-beam or the like. The organization thus far described is usual with many types of tractors and is not claimed as new.

One practical embodiment of the invention as illustrated in the drawings comprises:

A pair of heavy upwardly and slightly outstanding parallel legs 10 and 11 having respective flanged bottoms 12 and 13, are securely attached by bolts or the like 14 to the upper face of said frame member 8. Said legs 10 and 11 are preferably spaced equally upon each side of the longitudinal center point of said beam 8. Said legs 10 and 11 support upon their upper ends a horizontal pipe or tube 15 which in turn supports by brackets 30 and 31, a smaller tube or pipe 16 parallel to said tube 15. Said tube 15 is further supported by braces 17 and 18. Attached at a desired point upon the front end portion of said tube 15 is a brace rod 19 which extends across the vehicle and attaches a bracket 20 formed upon said front axle 1. In crossing the vehicle, said rod 19 passes between the front end of the power plant and the rear end of said radiator. Attached at a desired point upon the rear end portion of said tube 15 is a brace rod 21 which may extend to and attach the usual differential housing, not shown, of the vehicle, or may be attached to said rear axle 9 in the manner in which said rod 19 attaches said axle 8.

The manner in which the upper end of said rod 19 is attached to said tube 15 is best seen in Fig. 4, in which a bracket 22 and a pin 23 act as a means for making a pivotal attachment. The mode of attachment as shown in Fig. 4 is typical with the manner of attaching rod 19 to said bracket 20 and also with the manner in which said rod 21 is attached to said tube 15 and the said vehicle differential housing or rear axle 9.

A boom mast 38 having its lower end bifurcated to form two outspread legs 39 and 24 has the lower end of said legs attached to the upper face of said beam 9. The manner of attachment may best be seen in Fig. 5, in which an upstanding bracket 25 and a pivot pin 26 embrace the lower end of each leg. Said mast 38 has a plurality of eyes 27 for engaging the usual hoisting tackle, not shown.

The means for adjusting the outward angle at which said mast 38 is disposed, comprises: a hollow tube 28 pivotally attached at its lower end, in the manner described with reference to Fig. 4, to the longitudinal center point of said tube 15. Said tube 28 at its upper end portion slidably receives the lower end portion of a smaller tube 29 the upper end of which is connected by a chain link 32 to an eye 33 in said mast 38. As may best be seen in Fig. 3, said tube 28 is provided with a plurality of pairs of alined perforations 34 which are adapted to receive a pin 35 therethrough for engaging alined perforations in the lower end portion of said tube 29. The positioning of said pin 35 in various selected pairs of said perforations 34, will vary the angle at which said mast is disposed.

A plurality of metal weights 36 each having a shaped transverse groove 37 will be supported by said tubes 15 and 16, and will act as a counter-balance for the weight of any object supported by the tackle attached to said mast 38.

Should it be desired to attach the device in which mast 38 will function from the front of the vehicle, the legs 39 will be attached to said axle 1, members 10 and 11 will be attached to the rear axle 2, and the lower ends of said rods 19 and 21 will be attached to said axle 2.

Applicant believes that by reading the foregoing description the manner of the operation will be obvious, and therefore has not deemed it necessary to describe the operation of the device further.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. A boom attachment for vehicles, embodying a mast pivotally attached at its lower end directly to one horizontal member of the vehicle frame, a counter-balance weight rigidly supported upon and above the opposite horizontal frame member of said vehicle, means for bracing said weight to said mast supporting member, and means for adjustably positioning said mast in varying angles with reference to said mast supporting member.

2. A boom attachment for vehicles, embodying a mast pivotally attached at its lower end directly to one horizontal member of the vehicle frame, a counter-balance weight rigidly supported upon and above the opposite horizontal frame member of said vehicle, means for bracing said weight to said mast supporting member, and telescoping means for adjustably positioning said mast in varying angles with reference to said mast supporting member.

3. A boom attachment for vehicles, embodying a substantially inverted Y shaped mast, its outstanding legs pivotally attached at their lower ends to one horizontal member of the vehicle frame, a counter-balance weight rigidly supported upon and substantially above the opposite horizontal frame member of said vehicle, means for bracing said weight to said mast supporting member, and means for adjustably positioning said mast in varying angles with reference to said mast supporting frame member.

4. A boom attachment for vehicles, embodying a substantially inverted Y shaped mast, its outstanding legs pivotally attached at their lower ends directly to one horizontal member of the vehicle frame, a counterbalance weight rigidly supported upon and substantially above the opposite horizontal frame member of said vehicle, means for bracing said weight to said mast supporting member, and telescoping means for adjustably positioning said mast in varying angles with reference to said mast supporting frame member.

5. Organization as described in claim 2, in which said telescoping means comprises, a first tube having its lower end pivotally attached with reference to said weight, a second tube having its lower portion slidably engaged within said first tube, and having its upper end pivotally attached to the upper portion of said mast, said first tube having a plurality of alined transverse pairs of perforations therethrough, said second tube having one pair of alined transverse perforations therethrough adapted to coincide with different pairs of said perforations in said first tube, and a pin adapted to be inserted through one selected pair of the perforations in said first tube and through the said pair of perforations in said second tube.

6. Organization as described in claim 2, in which said weight bracing means comprises a rod having its upper end pivotally attached with reference to said weight, and having its lower end pivotally attached to the vehicle axle adjacent said mast supporting member.

7. A boom attachment for vehicles, having in combination, a substantially inverted Y shaped mast, its outstanding legs pivotally attached at their lower ends directly to one horizontal member of the vehicle frame, a counter-balance weight rigidly supported upon and substantially above the opposite horizontal frame member of said vehicle, means for bracing said weight to said mast supporting member, and telescoping means for adjustably positioning said mast in varying angles with reference to said mast supporting frame member.

MAGNUS BERG.